United States Patent [19]
Stine et al.

[11] Patent Number: 5,974,906
[45] Date of Patent: Nov. 2, 1999

[54] JAW CLUTCH ENGAGEMENT CONTROL FOR ASSISTED, MANUALLY SHIFTED, SPLITTER-TYPE TRANSMISSION SYSTEM

[75] Inventors: Alan C. Stine; David L. Wadas, both of Kalamazoo; Alan R. Davis, Plainwell, all of Mich.

[73] Assignee: Eaton Corporation, Cleveland, Ohio

[21] Appl. No.: 09/053,091

[22] Filed: Apr. 1, 1998

[51] Int. Cl.⁶ ................................................ F16H 61/00
[52] U.S. Cl. ........................ 74/335; 74/336 R; 477/124
[58] Field of Search ................ 74/335, 336; 477/124, 477/123

[56] References Cited

U.S. PATENT DOCUMENTS

| | | | |
|---|---|---|---|
| 4,527,447 | 7/1985 | Richards | 74/336 |
| 4,754,665 | 7/1988 | Vandervoort | 74/745 |
| 4,920,815 | 5/1990 | Reynolds | 74/335 |
| 4,974,468 | 12/1990 | Reynolds et al. | 74/477 |
| 5,000,060 | 3/1991 | Reynolds et al. | 74/745 |
| 5,222,404 | 6/1993 | Stine | 74/335 |
| 5,231,895 | 8/1993 | Stine | 74/335 X |
| 5,329,826 | 7/1994 | Graves, Jr. et al. | 74/336 R X |
| 5,370,013 | 12/1994 | Reynolds et al. | 74/330 |
| 5,390,561 | 2/1995 | Stine | 74/331 |
| 5,582,558 | 12/1996 | Palmeri et al. | 477/109 |
| 5,651,292 | 7/1997 | Genise | 74/745 |
| 5,661,998 | 9/1997 | Genise | 74/335 |

*Primary Examiner*—Khoi Q. Ta
*Attorney, Agent, or Firm*—Howard D. Gordon

[57] ABSTRACT

A control for controlling splitter clutch (88) engagement for compound shifts in a controller (48) assisted manually shifted splitter-type vehicular transmission system (10). The controller has logic rule for sensing an attempted compound shift of the splitter-type transmission (16) and will retain the splitter clutch in a disengaged condition (N) until engagement of a main transmission section (16A) ratio from main transmission section neutral is sensed.

20 Claims, 6 Drawing Sheets

JAW CLUTCH ENGAGEMENT CONTROL FOR ASSISTED, MANUALLY SHIFTED, SPLITTER-TYPE TRANSMISSION SYSTEM

RELATED APPLICATIONS

This application is related to the following co-pending applications, all assigned to EATON CORPORATION, the assignee of this application:

Ser. No. 09/053,089 [96-TRN-263] mailed Apr. 1, 1998 and titled RANGE SHIFT CONTROL Ser. No. 09/053,093 [97-TRN-561] mailed Apr. 1, 1998 and titled ADAPTIVE UPSHIFT JAW CLUTCH ENGAGEMENT CONTROL Ser. No. 09/053,092 [97-TRN-566] mailed Apr. 1, 1998 and titled ENGINE FUEL CONTROL FOR COMPLETING SHIFTS IN CONTROLLER-ASSISTED, MANUALLY SHIFTED TRANSMISSIONS Ser. No. 09/053,095 [97-TRN-567] mailed Apr. 1, 1998 and titled DYNAMIC RANGE SHIFT ACTUATION Ser. No. 09/053,090 [98-TRN-092] mailed Apr. 1, 1998 and titled ADAPTIVE NEUTRAL SENSING Ser. No. 09/053,181 [98-TRN-101] mailed Apr. 1, 1998 and titled ADAPTIVE SPLITTER ACTUATOR ENGAGEMENT FORCE CONTROL Ser. No. 08/902,603 filed Aug. 7, 1997 and titled PARIALLY AUTOMATED, LEVER-SHIFTED MECHANICAL TRANSMISSION SYSTEM Ser. No. 08/990,678 [97-rTRN-495] mailed Dec. 11, 1997 and titled ASSISTED LEVER-SHIFTED TRANSMISSION.

BACKGROUND OF THE INVENTION

1. Field of the Invention

The present invention relates to a control for controlling splitter section jaw clutch engagement during completion of a transmission shift, and in particular, to a control wherein a controller commands engagement of splitter jaw clutches during a compound transmission shift in a sequencewherein the splitter section is moved to and retained in neutral until the main section is sensed as being engaged. In the preferred embodiment, the splitter jaw clutch is a double sided jaw clutch manipulated by a three-position, ECU-controlled actuator and engagements are commanded only when transmission input shaft speed is or is expected to be within a predetermined offset of a true synchronous speed (IS=OS*$GR_T$). The magnitude of the offset (i.e., the width of the "synchronous window") is, preferably, adaptively varied as a function of the rate of change of vehicle speed (d/dt(OS)) and of engine rotational speed (d/dt(ES)).

2. Description of the Prior Art

Compound manually shifted mechanical transmissions of the range, splitter and/or combined range/splitter type are in wide use in heavy-duty vehicles and are well known in the prior art, as may be seen by reference to U.S. Pat. Nos. 4,754,665; 5,272,929; 5,370,013 and 5,390,561, 5,546,823; 5,609,062 and 5,642,643, the disclosures of which are incorporated herein by reference. Typically, such transmissions include a main section shifted directly or remotely by a manual shift lever and one or more auxiliary sections connected in series therewith. The auxiliary sections most often were shifted by a slave actuator, usually pneumatically, hydraulically, mechanically and/or electrically operated, in response to manual operation of one or more master switches. Shift controls for such systems by be seen by reference to U.S. Pat. Nos. 4,455,883; 4,550,627; 4,899,607; 4,920,815; 4,974,468; 5,000,060; 5,272,931; 5,281,902; 5,222,404 and 5,350,561, the disclosures of which are incorporated herein by reference.

Fully or partially automated transmission systems wherein a microprocessor-based electronic control unit (ECU) receives input signals indicative of various system operating conditions and processes same according to logic rules to issue command output signals to one or more system actuators are known in the prior art, as may be seen by reference to U.S. Pat. Nos. 4,361,060; 4,593,580; 4,595,986; 4,850,236; 5,435,212; 5,582,069; 5,582,558; 5,620,392; 5,651,292 and 5,679,096; 5,682,790; the disclosures of which are incorporated herein by reference.

SUMMARY OF THE INVENTION

A preferred embodiment of the present invention involves a computer-assisted mechanical compound transmission system wherein the main section is shifted by a manually controlled shift lever and the engine is fueled and/or the auxiliary sections are shifted by actuators at least partially controlled by an ECU to enhance shifting. The ECU uses sensed and/or calculated inputs indicative of system operating parameters, such as operation of a splitter switch and/or a range switch, position and/or rate of change of position of the shift lever, engaged gear ratio, engine speed, rate of change of engine speed, output shaft speed, rate of change of output shaft speed, clutch condition and/or throttle pedal position, to assist shifting by controlling engine fueling and/or operation of the range and/or splitter shift actuators.

In accordance with the present invention, the drawbacks of the prior art are minimized or overcome by the provision of a splitter section jaw clutch control which commands compound shifts by a sequence wherein the splitter section is moved to and retained in a neutral position while the main transmission section is engaged and then the compound shift is completed by engagement of the splitter section. Preferably the control will adaptively adjust the "synchronous window" for engaging the jaw clutch members to provide an optimized compromise, in view of vehicle operating conditions, between reliable shifting, fast shifting and shock-free shifting (i.e., little or no shift shock) and/or will provide automatic engine fueling control if the operators control of engine fueling will prevent engagement of the splitter clutch.

In the preferred embodiment, the three-position splitter clutch (see U.S. Pat. No. 5,651,292) of the controller-assisted, manually shifted transmission is controlled during upshifts by varying the synchronous window at which splitter clutch engagements are commanded as a function of the rates of change with respect to time of both engine speed (d/dt(ES)) and vehicle speed (d/dt(OS)). Preferably, If the vehicle deceleration is less than a vehicle deceleration reference value (i.e., d/dt(OS)>$REF_1$?), then the offset or synchronous window remains at a default value selected to provide good quality shifts. However, if vehicle deceleration is great (i.e., d/dt(OS)<$REF_1$?), the synchronous window will be opened (i.e., offset increased) as a function of vehicle deceleration if engine deceleration is at least a reference value (i.e., d/dt(ES)<$REF_2$?), or as a function of both vehicle deceleration and of engine deceleration if engine deceleration is relatively low (i.e., d/dt(ES)>$REF_2$?).

Accordingly, it is an object of the present invention to provide ECU assistance for enhanced upshifting of a mechanical compound transmission.

This and other objects and advantages of the present invention will become apparent from a reading of the following description of the preferred embodiment taken in connection with the attached drawings.

DESCRIPTION OF THE PREFERRED EMBODIMENT

A computer-assisted (i.e., microprocessor-based, controller-assisted) vehicular compound mechanical transmission system 10, particularly well suited to utilize the adaptive jaw clutch engagement control of the present invention, may be seen by reference to FIGS. 1–5B.

Figure 1:
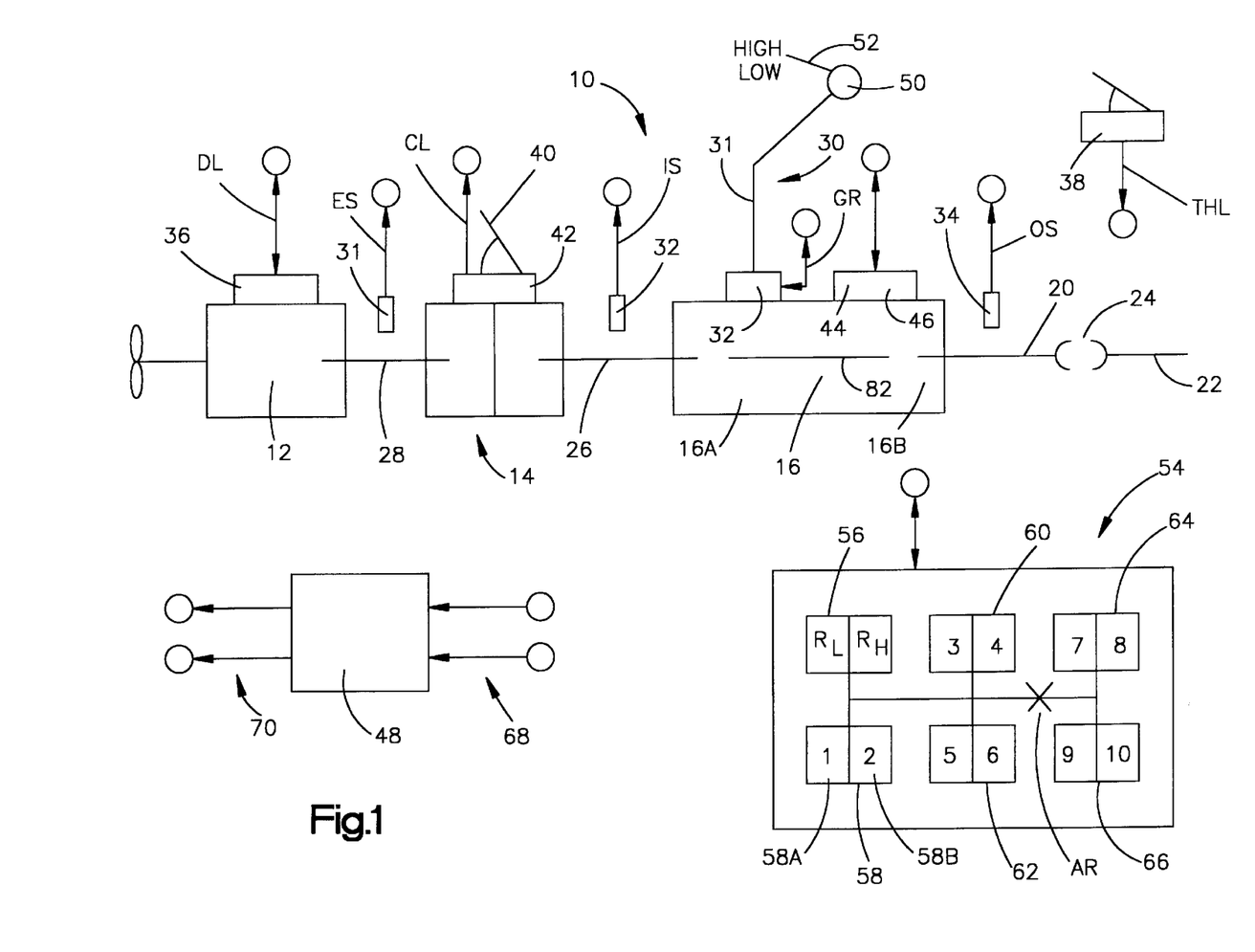
FIG. 1 is a schematic illustration of an ECU-assisted compound mechanical transmission system advantageously utilizing the adaptive jaw clutch engagement control of the present invention.

System 10 is of the type commonly utilized in heavy-duty vehicles, such as the conventional tractors of tractor/semi-trailer vehicles, and includes an engine, typically a diesel engine 12, a master friction clutch 14 contained within a clutch housing, a multiple-speed compound transmission 16, and a drive axle assembly (not shown). The transmission 16 includes an output shaft 20 drivingly coupled to a vehicle drive shaft 22 by a universal joint 24 for driving the drive axle assembly. The transmission 16 is housed within a transmission housing to which is directly mounted the shift tower of the shift lever assembly 30. The present system is equally applicable to remotely mounted shift levers, as are used in cab-over-engine types of vehicles.

Figure 2:
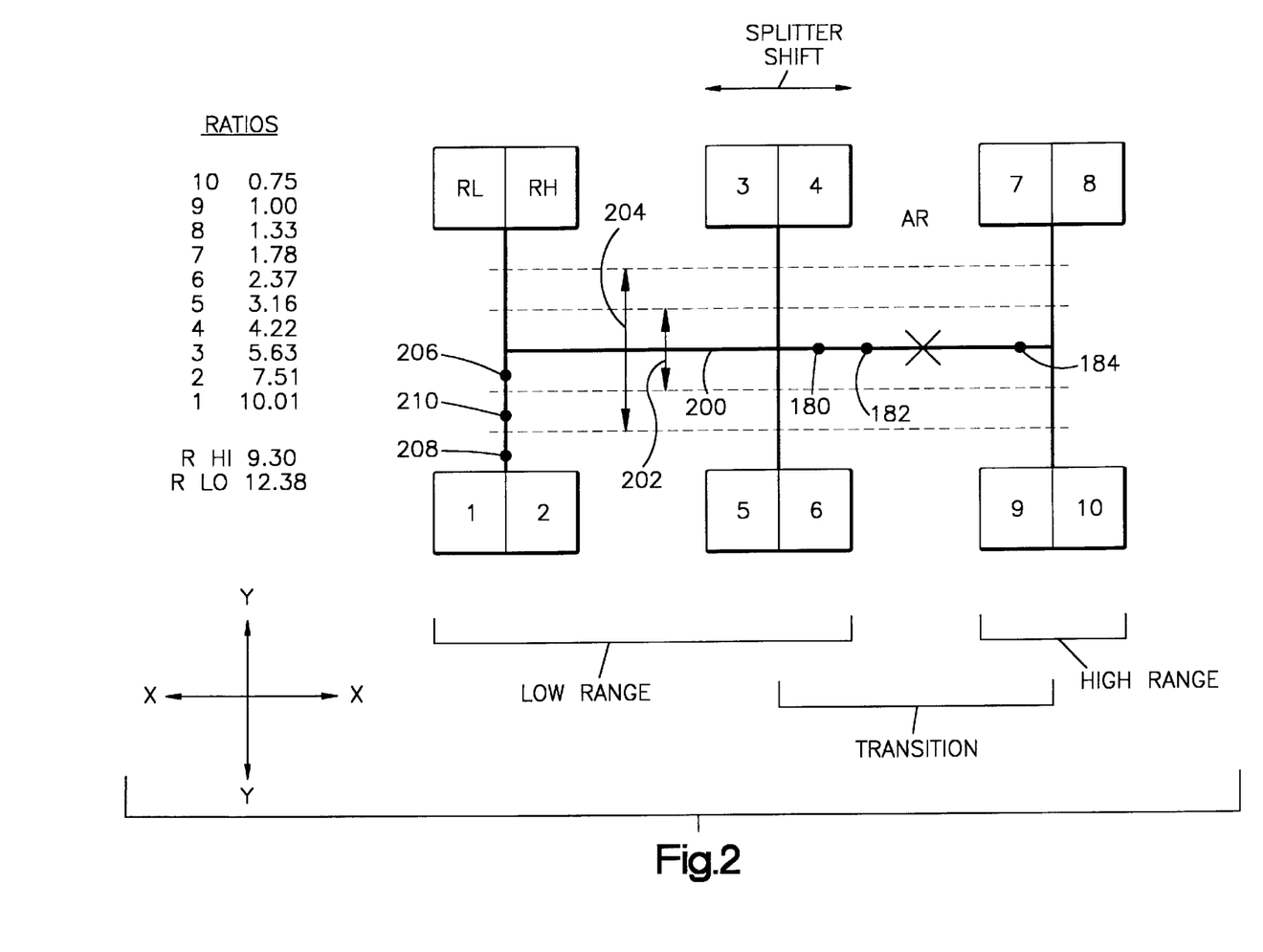
FIG. 2 is a chart illustrating the shift pattern and representative numerical ratios for the transmission of FIG. 1.

FIG. 2 illustrates a shift pattern for assisted manual shifting of a combined range-and-splitter-type compound transmission shifted by a manually operated shift lever. Briefly, the shift lever 31 is movable in the side-to-side or X—X direction to select a particular ratio or ratios to be engaged and is movable in the fore and aft or Y—Y direction to selectively engage and disengage the various ratios. The shift pattern may include an automatic range shifting feature and automatically selected and/or implemented splitter shifting, as is known in the prior art. Manual transmissions utilizing shift mechanisms and shift patterns of this type are well known in the prior art and may be appreciated in greater detail by reference to aforementioned U.S. Pat. Nos. 5,000,060 and 5,390,561.

Typically, the shift lever assembly 30 will include a shift finger or the like (not shown) extending downwardly into a shifting mechanism 32, such as a multiple-rail shift bar housing assembly or a single shift shaft assembly, as is well known in the prior art and as is illustrated in aforementioned U.S. Pat. Nos. 4,455,883; 4,550,627; 4,920,815 and 5,272,931.

In the automatic range shifting feature, as the shift lever moves in the transition area between the middle leg (3/4–5/6) and the righthand leg (7/8–9/10) of the shift pattern, it will cross a point, AR, which will actuate a mechanical or electrical range switch, or will be sensed by a position sensor, to cause automatic implementation of a range shift.

Shifting of transmission 16, comprising main section 16A coupled in series to auxiliary section 16B, is semi-automatically implemented/assisted by the vehicular transmission system 10, illustrated in FIGS. 1–5B. Main section 16A includes an input shaft 26, which is operatively coupled to the drive or crank shaft 28 of the vehicle engine 12 by master clutch 14, and output shaft 20 of auxiliary section 16B is operatively coupled, commonly by means of a drive shaft 24, to the drive wheels of the vehicle. The auxiliary section 16B is a splitter type, preferably a combined range-and-splitter type, as illustrated in U.S. Pat. Nos. 4,754,665 and 5,390,561.

The change-gear ratios available from main transmission section 16 are manually selectable by manually positioning the shift lever 31 according to the shift pattern prescribed to engage the particular desired change gear ratio of main section 16A.

The system may include sensors 30 (for sensing engine rotational speed (ES)), 32 (for sensing input shaft rotational speed (IS)), and 34 (for sensing output shaft rotational speed (OS)), and providing signals indicative thereof. As is known, with the clutch 14 fully (i.e., no slip) engaged and the transmission engaged in a known gear ratio, ES=IS=OS*GR (see U.S. Pat. No. 4,361,060). Accordingly, if clutch 14 is engaged, engine speed and input shaft speed may be considered as equal and sensor 32 may be eliminated. Input shaft speed sensor 32 may be eliminated and engine speed (ES), as sensed by a sensor or over a data link (DL), substituted therefor.

Engine 12 is electronically controlled, including an electronic controller 36 communicating over an electronic data link (DL) operating under an industry standard protocol such as SAE J-1922, SAE J-1939, ISO 11898 or the like. Throttle position (operator demand) is a desirable parameter for selecting shifting points and in other control logic. A separate throttle position sensor 38 may be provided or throttle position (THL) may be sensed from the data link. Gross engine torque ($T_{EG}$) and base engine friction torque ($T_{BEF}$) also are available on the data link.

A manual clutch pedal 40 controls the master clutch 14, and a sensor 42 provides a signal (CL) indicative of clutch-engaged or -disengaged condition. The condition of the clutch also may be determined by comparing engine speed to input shaft speed if both signals are available. An auxiliary section actuator 44 including a range shift actuator and a splitter actuator 46 is provided for operating the range clutch and the splitter section clutch in accordance with command output signals from ECU 48. The shift lever 31 has a knob 50 which contains splitter selector switch 52 by which a driver's intent to initiate a splitter shift may be sensed.

System 10 may include a driver's display unit 54 including a graphic representation of the six-position shift pattern with individually lightable display elements 56, 58, 60, 62, 64 and 66, representing each of the selectable engagement positions. Preferably, each half of the shift pattern display elements (i.e., 58A and 58B) will be individually lightable, allowing the display to inform the driver of the lever and splitter position for the engaged ratio.

The system includes a control unit or ECU 48, preferably a microprocessor-based control unit of the type illustrated in U.S. Pat. Nos. 4,595,986; 4,361,065 and 5,335,566, the disclosures of which are incorporated herein by reference, for receiving input signals 68 and processing same according to predetermined logic rules to issue command output signals 70 to system actuators, such as the splitter section actuator 46, the engine controller 36, the range shift actuator and/or the display unit 54. A separate system controller may be utilized, or the engine controller ECU 36 communicating over an electronic data link may be utilized.

As shown in U.S. Pat. No. 5,651,292 (the disclosure of which is incorporated herein by reference) and co-pending patent application U.S. Ser. No. 08/597,304 (assigned to the assignee of this application), the splitter actuator 46 is an ECU-controlled, three-position device, allowing a selectable and maintainable splitter section neutral. Alternatively, a "pseudo" splitter-neutral may be provided by deenergizing the splitter actuator when the splitter clutch is in an intermediate, non-engaged position.

Figure 3:
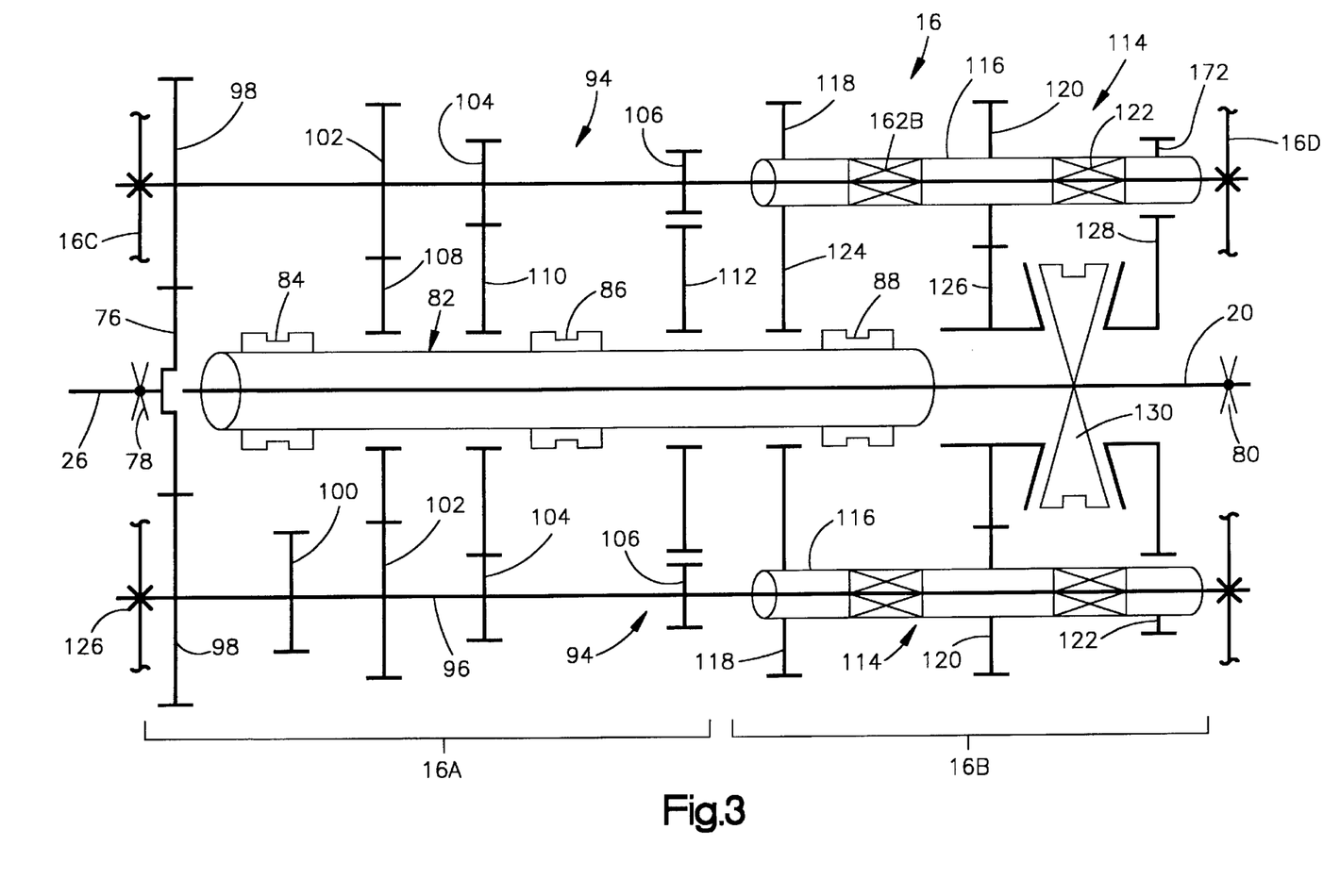
FIG. 3 is a schematic illustration of the structure of the compound mechanical transmission of FIG. 1.

The structure of the 10-forward-speed combined range-and-splitter-type transmission 16 is schematically illustrated in FIG. 3. Transmissions of this general type are disclosed in aforementioned U.S. Pat. Nos. 5,000,060; 5,370,013 and 5,390,561.

Transmission 16 includes a main section 16A and an auxiliary section 16B, both contained within a housing including a forward end wall 16C, which may be defined by the clutch housing, and a rearward end wall 16D, but (in this particular embodiment) not an intermediate wall.

Input shaft 26 carries input gear 76 fixed for rotation therewith and defines a rearwardly opening pocket wherein a reduced diameter extension of output shaft 20 is piloted. A non-friction bushing or the like may be provided in the pocket or blind bore. The rearward end of input shaft 26 is supported by bearing 78 in front end wall 16C, while the rearward end of output shaft 20 is supported by bearing assembly 80 in rear end wall 16D.

The mainshaft 82, which carries mainshaft clutches 84 and 86, and the mainshaft splitter clutch 88 is in the form of a generally tubular body having an externally splined outer surface and an axially extending through bore for passage of output shaft 20. Shift forks 90 and 92 are provided for shifting clutches 84 and 86, respectively (see FIG. 5A). Mainshaft 82 is independently rotatable relative to input shaft 26 and output shaft 20 and preferably is free for limited radial movement relative thereto.

The main section 16A includes two substantially identical main section countershaft assemblies 94, each comprising a main section countershaft 96 carrying countershaft gears 98, 100, 102, 104 and 106 fixed thereto. Gear pairs 98, 100, 102, 104 and 106 are constantly meshed with input gear 76, mainshaft gears 108 and 110 and an idler gear (not shown), which is meshed with reverse mainshaft gear 112, respectively.

Main section countershaft 96 extends rearwardly into the auxiliary section, where its rearward end is supported directly or indirectly in rear housing end wall 16D.

The auxiliary section 16B of transmission 16 includes two substantially identical auxiliary countershaft assemblies 114, each including an auxiliary countershaft 116 carrying auxiliary countershaft gears 118, 120 and 122 for rotation therewith. Auxiliary countershaft gear pairs 118, 120 and 122 are constantly meshed with splitter gear 124, splitter/range gear 126 and range gear 128, respectively. Splitter clutch 88 is fixed to mainshaft 82 for selectively clutching either gear 124 or 126 thereto, while synchronized range clutch 130 is fixed to output shaft 20 for selectively clutching either gear 126 or gear 128 thereto.

Auxiliary countershafts 116 are generally tubular in shape, defining a through bore for receipt of the rearward extensions of the main section countershafts 96. Bearings or bushings are provided to rotatably support auxiliary countershaft 116 on main section countershaft 96.

The splitter jaw clutch 88 is a double-sided, non-synchronized clutch assembly which may be selectively positioned in the rightwardmost or leftwardmost positions for engaging either gear 126 or gear 124, respectively, to the mainshaft 82 or to an intermediate position wherein neither gear 124 or 126 is clutched to the main shaft. Splitter jaw clutch 88 is axially positioned by means of a shift fork 98 controlled by a three-position actuator, such as a piston actuator, which is responsive to, control signals from ECU 48 (see U.S. Pat. No. 5,661,998). The ECU will receive signals from a driver selection switch such as a button or the like on the shift knob. Two-position synchronized range clutch assembly. 130 is a two-position clutch which may be selectively positioned in either the rightwardmost or leftwardmost positions thereof for selectively clutching either gear 128 or 126, respectively, to output shaft 20. Clutch assembly 130 is positioned by means of a shift fork (not shown) operated by means of a two-position piston device. Either piston actuator may be replaced by a functionally equivalent actuator, such as a ball screw mechanism, ball ramp mechanism or the like.

By selectively axially positioning both the splitter clutch 88 and the range clutch 130 in the forward and rearward axial positions thereof, four distinct ratios of mainshaft rotation to output shaft rotation may be provided. Accordingly, auxiliary transmission section 16B is a three-layer auxiliary section of the combined range and splitter type providing four selectable speeds or drive ratios between the input (mainshaft 82) and output (output shaft 20) thereof. The main section 16A provides a reverse and three potentially selectable forward speeds. However, one of the selectable main section forward gear ratios, the low-speed gear ratios associated with mainshaft gear 110, is not utilized in the high range. Thus, transmission 16 is properly designated as a "(2+1)×(2×2)" type transmission providing nine or ten selectable forward speeds, depending upon the desirability and practicality of splitting the low gear ratio.

Splitter shifting of transmission 16 is accomplished responsive to initiation by a vehicle operator-actuated splitter button 52 or the like, usually a button located at the shift lever knob, while operation of the range clutch shifting assembly is an automatic response to movement of the gear shift lever between the central and rightwardmost legs of the shift pattern, as illustrated in FIG. 2. Alternatively, splitter shifting may be automated (see U.S. Pat. No. 5,435,212). Range shift devices of this general type are known in the prior art and may be seen by reference to aforementioned U.S. Pat. Nos. 3,429,202; 4,455,883; 4,561,325 and 4,663,725.

Although the present invention is illustrated in the embodiment of a compound transmission not having an intermediate wall, the present invention is equally applicable to transmissions of the type illustrated in aforementioned U.S. Pat. Nos. 4,754,665; 5,193,410 and 5,368,145.

In the prior art, especially for manual transmissions, the splitter clutches were operated by two-position actuators and, thus, were provided with a relatively small backlash (i.e., about 0.008–0.012 inches backlash for a clutch having about a 3.6-inch pitch diameter) to prevent unduly harsh splitter shifting. Typically, with the above backlash and the usual engagement forces, at greater than about 60 RPM input shaft synchronous error, the clutch teeth would ratchet or "buzz" and clutch engagement would not occur.

As is known (see U.S. Pat. No. 5,052,535, the disclosure of which is incorporated herein by reference), allowable relative rotational speed at which the positive clutches will properly engaged (i.e., sufficient clutch tooth penetration will occur) is a directly proportional function of the total effective backlash in the clutch system. The maximum allowable asynchronous conditions at which clutch engagement is allowed is selected in view of the most harsh clutch engagement which is acceptable.

In change-gear transmissions utilizing the non-synchronized positive clutch structures, especially for heavy-duty vehicles, for a given total backlash (i.e., a given maximum allowably harsh clutch engagement), the range of asynchronous conditions at which the clutch members will engage is often narrower than desirable under certain conditions, making shifting more difficult.

According to the preferred embodiment of the present invention, and as more fully described in aforementioned U.S. Pat. No. 5,651,292, the interengaging clutch teeth provided on splitter clutch 88 and on splitter gear 124 and splitter/range gear 126 are of a relatively large backlash (i.e., about 0.020–0.060 inches for a 3.6-inch pitch diameter clutch), which will assure that almost any attempted splitter shift under full force will be completed.

Figure 4:
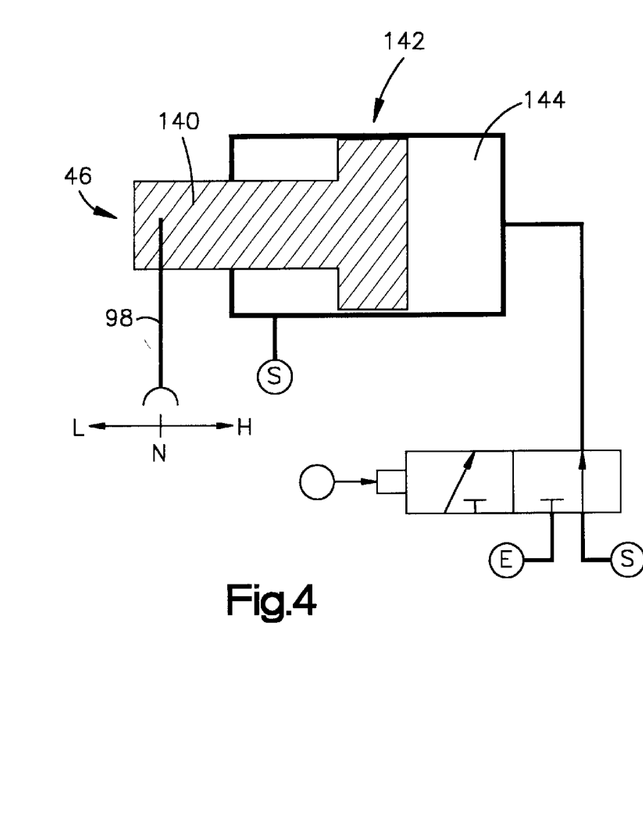
FIG. 4 is a schematic illustration of a three-position splitter actuator for use with the transmission system of FIG. 1.

The splitter clutch 88 is moved by a shift fork 98 attached to the piston rod 140 of the piston actuator assembly 142 (see FIG. 4). Actuator assembly 142 may be a conventional three-position actuator (see U.S. Pat. No. 5,054,591, the disclosure of which is incorporated herein by reference) or an actuator of the type illustrated in U.S. Pat. Nos. 5,682,790 or 5,661,998 (the disclosures of which are incorporated herein by reference), wherein pulse width modulation of a selectively pressurized and exhausted chamber 144 may be used to achieve the three splitter positions (L, N, H) of the shift fork.

Preferably, the splitter clutch actuator 142 will be capable of applying a variable force, such as by pulse width modulation, of supply pressure. A force lesser than full force may be utilized when disengaging and/or when synchronous conditions cannot be verified.

In system 10, splitter switch 52 will initiate a splitter shift under the control of ECU 48. The controller 48 is provided with logic rules under which, if the main section is engaged, a shift from splitter neutral into a selected target splitter ratio is initiated such that, under normal conditions, including proper operator fuel control, the synchronous error (which is equal to input shaft rotational speed minus the product of output shaft rotational speed and transmission target gear ratio) is expected to be equal to or less than a value selected to give smooth, high-quality shifts ((IS−(OS*GR))= ERROR≦REF). The timing is done in regard to sensed/ expected shaft speeds, shaft acceleration/deceleration and actuator reaction times. As is known, automated hydraulic, pneumatic or mechanical jaw clutch engagement systems have to be tuned to deliver a clutch engagement that is a compromise between engaging the clutch without shift shock and delivering a fast shift. If the clutch engages only exactly at synchronous, the driver may get impatient and reapply fuel before the clutch engages. This approach also may result in the shift being missed on a grade or any situation that causes the vehicle to decelerate quickly or the engine to decelerate slowly. If the clutch engages far out of synchronous, the driver complains about the "shift shock" or jerk that occurs as the clutch engages.

According to the preferred embodiment of the present invention, in certain situations, the logic rules will recognize operating conditions wherein the preferred or default synchronous window (i.e., IS=(OS*GR)±60 RPM) must be expanded to accomplish a splitter shift, even at the expense of shift quality. These situations, usually associated with upshifts, include if shifting is attempted at low engine speeds wherein expected engine speed at shift completion will be undesirably low, if deceleration of the output shaft is relatively high (dOS/dt<$REF_1$), if the deceleration of the engine is relatively low (dES/dt>$REF_2$) and/or if the absolute value of the synchronous error is not approaching the normal value at an acceptable rate.

In the preferred embodiment of the present invention, completion of splitter shifts (i.e., a shift from the centered or neutral position into the target splitter ratio) is commanded when input shaft rotational speed (IS) is or is expected to be within the synchronous window (i.e., $((OS*GR_T)+offset_1)$ >IS>$((OS*GR_T)-offset_2)$). Assuming for this discussion that the offsets are equal, this may be written IS=$((OS*GR_T)$ ±offset). At ideal operating conditions, the offset is at a default minimal value intended to provide an acceptable shift quality and shift quickness. In the example above, the default offset was ±60 RPM, giving a default synchronous window width of 120 RPM.

By using a three-position splitter actuator and increased splitter clutch backlash, splitter clutch engagements are possible but not usually desirable (for shift quality and other reasons) over a very great band of non-synchronous conditions.

According to the jaw clutch control of the preferred embodiment of the present invention, in the event of a splitter upshift, when in "splitter neutral," the ECU will compare vehicle deceleration (as indicated by dOS/dt) to a reference value ($REF_1$) selected to represent the greatest vehicle acceleration under which the default synchronous window will allow rapid and reliable shifts. If vehicle deceleration exceeds this reference, the synchronous window should be expanded to provide more reliable (if somewhat harsher) splitter shifts. If not, the default synchronous window will provide sufficiently rapid and reliable shifting.

If vehicle acceleration does exceed the reference value, engine deceleration is compared to an engine deceleration reference value ($REF_2$) to determine if the engine is decelerating at least at an expected value (typically about −450 RPM to −600 RPM for a heavy-duty diesel truck engine). If the engine is decelerating in an acceptable manner, the synchronous window offset is increased only an amount determined as a function of vehicle deceleration. If, however, vehicle deceleration is great and engine deceleration is low (dES/dt>$REF_2$), then the synchronous window offset is increased an amount determined as a sum of (i) the amount determined as a function of vehicle deceleration and (ii) an amount determined as a function of engine deceleration.

Figure 6:
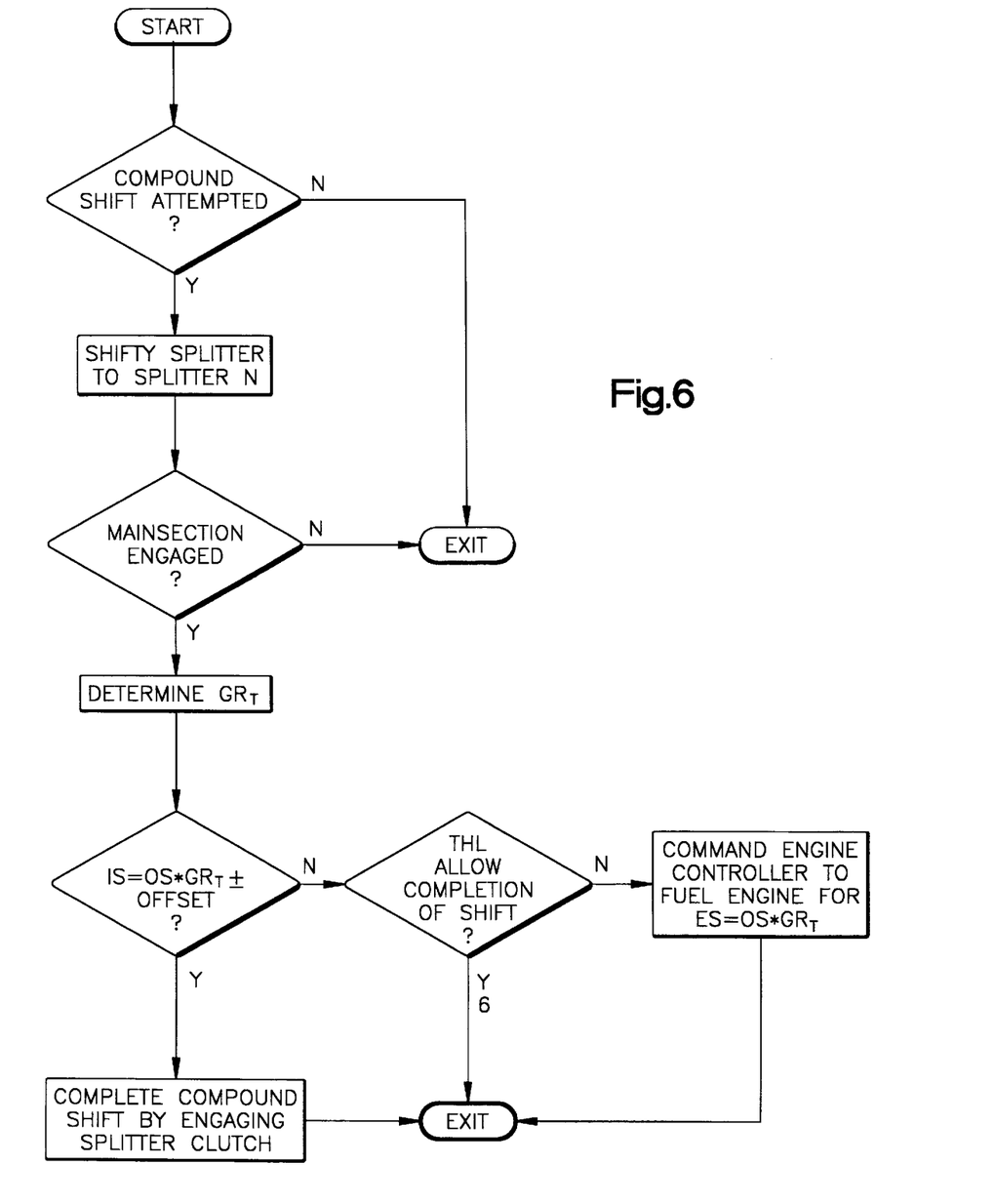
FIG. 6 is a schematic illustration, in flow chart format, of the control of the present invention.

For splitter-only shifts, such as 3-4, 4-3, 5-6 and 6-5 shifts, the shifts are accomplished by shifting to splitter section neutral and then engaging the appropriate splitter clutch. For combined main section and splitter section shifts (called "compound shifts"), such as 2-3,3-2, 4-5, 5-4, 8-9 and/or 9-8 shifts, the splitter clutch is moved to and held in the neutral or disengaged position until the main section is engaged (as may be sensed by the shift shaft position sensor assembly 166/168), and then the shift is completed by engaging the appropriate splitter clutch. Shifts wherein the splitter is shifted and the main transmission section is shifted into neutral and then back into the previously engaged mainsection ratio are also considered to be compound shifts. FIG. 6 illustrates, in flow chart format, the control of the present invention.

The compound shift sequence control of the present invention is as follows: (i) the operator will, preferably, preselect the required splitter shift (for example, in a 4-5 shift, the operator will preselect splitter low by use of switch 52), (ii) the operator will break torque using the master clutch 14 and/or the throttle control (see U.S. Pat. No. 4,850,236), (iii) the ECU will issue commands to the splitter actuator causing the splitter clutch to shift into and remain in neutral as the driver uses shift lever 31 to shift into main section neutral, (iv) the driver will engage the appropriate main section ratio using the shift lever (the driver should also be using the throttle pedal to cause the engine to be fueled such that substantially synchronous conditions occure (ES=OS * GR$_T$±an offset)), and (v) upon sensing engagement of the mainsection ratio, the compound shift will be completed when substantially synchronous conditions occure (ES=OS * GR$_T$±an offset). Preferably, if the operators throttle control will not allow for substantially synchronous conditions, the ECU will take command of engine fueling to assist completion of the compound shift.

By utilizing the above sequence, the main section may be engaged under almost any conditions as the mainshaft 82 is and remains disconnected from the output shaft.

The position of the shift lever 31 or of the shifting mechanism 32 controlled thereby may be sensed by a position sensor device. Various positioning sensing assemblies are known in the prior art, with a preferred type illustrated in allowed U.S. Ser. No. 08/695,052, assigned to the assignee of this application, the disclosure of which is incorporated herein by reference.

Figure 5A:
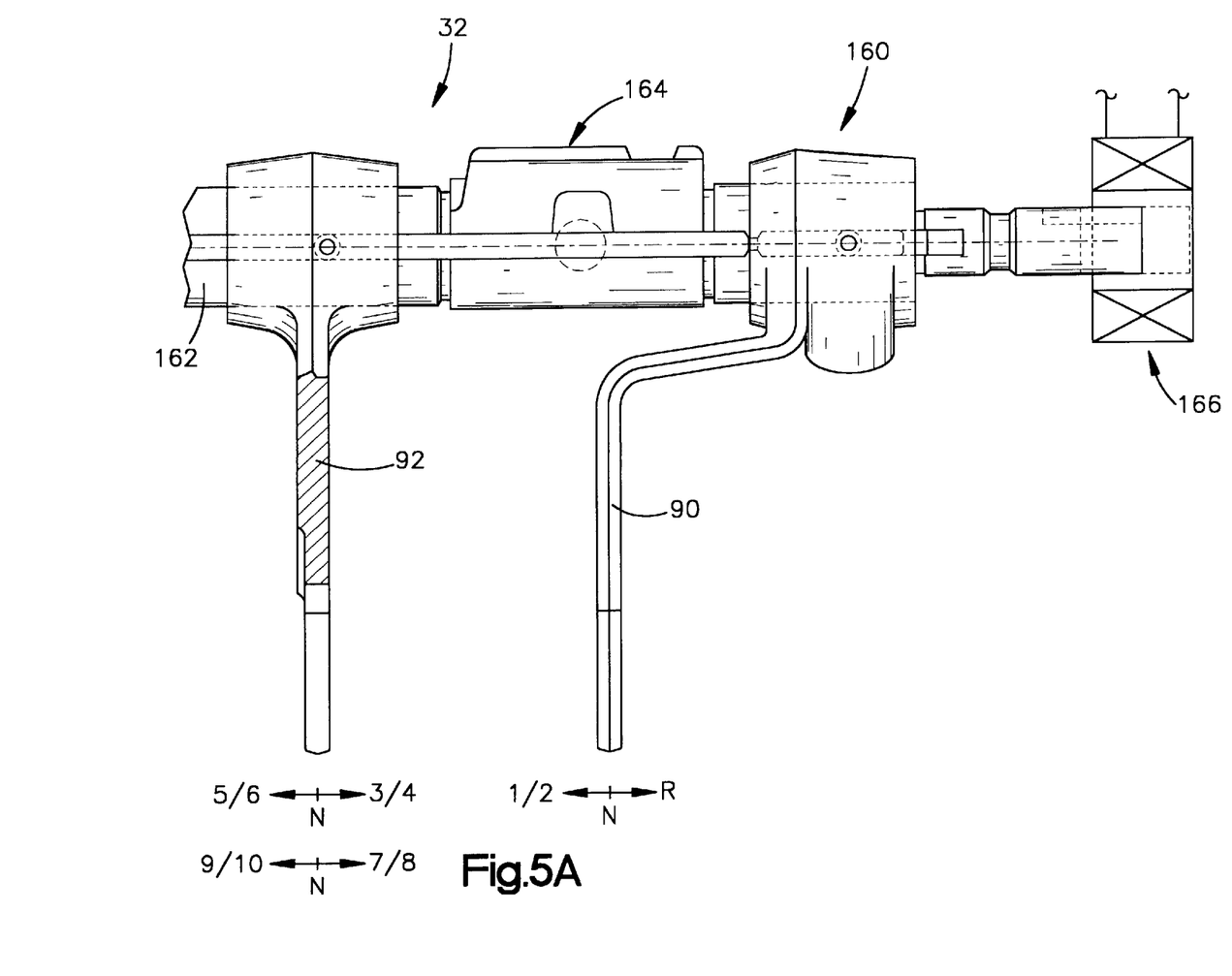
FIGS. 5A and 5B are schematic illustrations of a shift shaft position sensor mechanism for use in the system of FIG. 1.
Figure 5B:
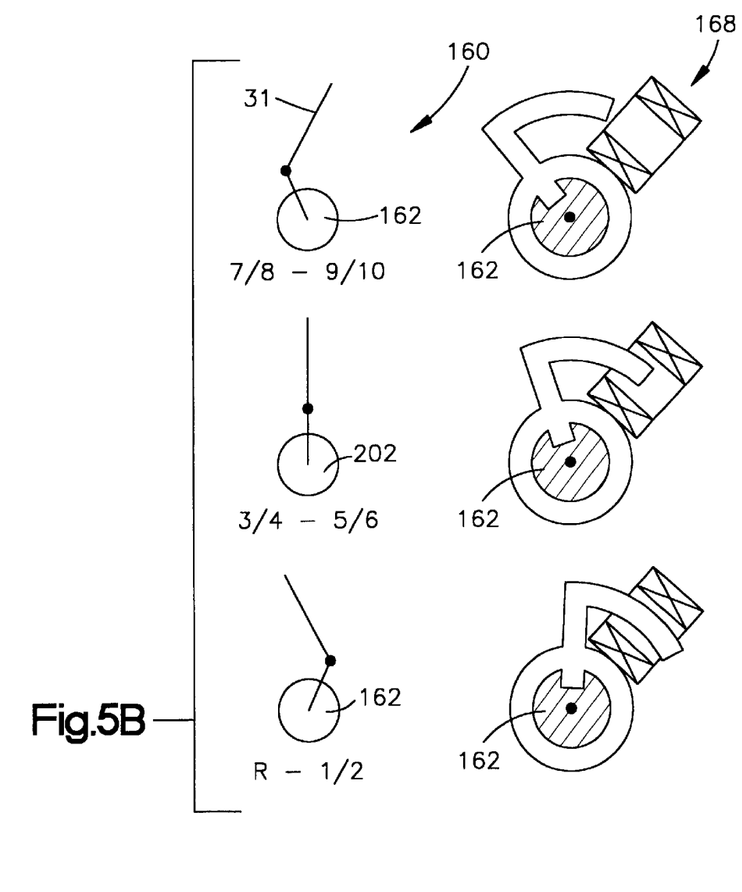

Referring to FIGS. 5A and 5B, shifting mechanism 32 is illustrated as a single shift shaft device 160 having a shaft 162 which is rotatable in response to X—X movements of shift lever 31 and axially movable in response to Y—Y movements of shift lever 31. Mechanisms of this type are described in detail in aforementioned U.S. Pat. No. 4,920,815.

Shift shaft 162 carries the main section shift forks 90 and 92 for selective axial movement therewith and a shift block member 164 for receiving a shift finger or the like. A pair of coils 166 and 168 provide a pair of signals (collectively GR) indicative of the axial and rotational position of shaft 162 and, thus, of shift lever 31 relative to the shift pattern illustrated in FIG. 2. Preferably, the rate of change of position (dGR/dt) also may be determined and utilized to enhance shifting of the system 10.

By way of example, referring to FIG. 2, if shift lever position can be sensed, the need for a fixed switch or the like at point AR to sense a required initiation of a shift between low range and high range is eliminated. Further, as physical switches are no longer required, the shift pattern position at which a range shift will be commanded can be varied, such as to points 180, 182 or 184, to enhance system performance under various operating conditions.

If in first (1st) through fourth (4th), a shift into high range is unlikely and the auto range shift initiation point may be moved to position 184 (away from the expected shift lever path) to prevent inadvertent actuation of a range shift. If in sixth (6th) with a high engine speed, a shift into high range is likely and moving the auto range initiation point to position 180 will allow for a quicker initiation of a range shift.

According to the preferred embodiment of the present invention, the operator is allowed to control engine fueling unless the current vehicle operating conditions indicate that his/her operation of the throttle pedal will not allow the jaw clutches associated with the current target ratio to engage. If operating conditions, including operator setting of the throttle pedal, indicate that the operator will complete a splitter shift into target ratio, the engine will be fueled in accordance with operator throttle setting. If not, automatic engine fueling will occur. If the splitter section does engage prior to the main section, as is preferred, the operator will remain in complete control of engine fueling to complete the shift by engaging the main section.

The state of engagement (i.e., engaged or neutral) of the main transmission section 16A is an important control parameter for system 10. By way of example, if main section neutral is sensed, the splitter may be commanded to a full force engagement, regardless of the existence or absence of synchronous conditions. Also, if the main section is engaged while the splitter is in neutral, the system will not cause splitter engagement until substantial synchronous is sensed and may then initiate automatic fuel control if required. Of course, it is important to prevent or minimize false determinations of main section neutral and/or engaged conditions.

Referring to FIG. 2, a first narrow band 202 and a second wider band 204 of vertical displacements from the bight portion 200 are utilized to determine if the main section is or is not in neutral. If the transmission main section is not confirmed as being in main section neutral, the neutral confirmation band will be the narrower band 202. This will assure that the main section 16A is truly in neutral before declaring a main section neutral condition. If the transmission main section 16A is confirmed as being in neutral, the neutral confirmation band will be the wider band 204. This assures that mere overshooting of neutral or raking of main section jaw clutches will not be incorrectly interpreted as a main section engaged condition.

Sensing the shift lever at point 206 will always be interpreted as main section neutral, and sensing the shift lever at point 208 will always be interpreted as main section engaged. However, if the shift lever is sensed at point 210, this will not cause a previous determination of a neutral or engaged condition to change.

Vehicle operating conditions other than or in addition to currently engaged or neutral condition of the main section 16A may be used to vary the width of the neutral sensing bands.

Accordingly, it may be seen that a new and improved splitter clutch control for an ECU-assisted manually shifted splitter-type transmission system is provided.

Although the present invention has been described with a certain degree of particularity, it is understood that the description of the preferred embodiment is by way of example only and that numerous changes to form and detail are possible without departing from the spirit and scope of the invention as hereinafter claimed.

We claim:

1. A method for controlling an ECU-assisted, manually shifted splitter-type vehicular transmission system during a compound shift into a target gear ratio (GR$_T$), said transmission system comprising a fuel-controlled engine, an engine controller for controlling the supply of fuel to the engine in response to command signals, a splitter-type mechanical change-gear transmission having an input shaft driven by said engine, an output shaft and defining a plurality of selectively engaged and disengaged gear ratios for providing various ratios of input shaft rotational speed to output shaft rotational speed (IS/OS), said transmission including (i) a main transmission section shifted by a shift lever and defining a plurality of selectable main section gear ratios and a main section neutral and (ii) a splitter section connected in series with said main transmission section, said splitter section including a positive splitter clutch mechanism for engaging a splitter high ratio and a splitter low ratio, a three-position splitter shift actuator for controlling engagement and disengagement of said positive splitter clutch mechanism in response to command signals, said actuator having (i) a first position for engaging said splitter high ratio and disengaging said splitter low ratio, (ii) a second position for engaging said splitter low ratio and disengaging said splitter high ratio and (iii) a third position for disengaging both said splitter high and low ratios, a splitter selection switch for providing a signal indicative of an operator selection of a splitter section shift, a control unit for receiving input signals indicative of vehicle operating conditions including at least one of (i) engine rotational speed (ES), (ii) input shaft rotational speed (IS), (iii) output shaft rotational speed (OS), (iv) operator selection of a splitter shift (High/Low) and (v) transmission main section engaged condition (GR), and for processing same according to logic rules to issue command signals to at least said splitter shift actuator, said method comprising:

determining an attempted compound shift into a target gear ratio ($GR_T$) by sensing selection of splitter section shift and a shift into main transmission section neutral;

upon sensing an attempted compound shift into a target gear ratio, commanding said splitter shift actuator to move to and remain in said third position thereof until said main transmission section is sensed as being engaged in one of said main transmission section gear ratios, and then commanding said splitter shift actuator to move to the one of said first and second positions thereof associated with said target gear ratio.

2. The method of claim 1 further comprising;

determining an attempted completion of a compound shift into a specific target gear ratio ($GR_T$) by sensing the requested splitter ratio and the specific main section ratio engaged after sensing an attempted compound shift.

3. The method of claim 2 wherein said logic rules require that input shaft speed is within an operational offset of true synchronous speed for engaging a target gear ratio ($IS = (OS*GR_T) \pm \text{offset}$) as a precondition for commanding engagement of said splitter section positive jaw clutch for completing engagement of said target gear ratio.

4. The method of claim 3 wherein said engine controller has at least one mode of operation wherein engine fueling is provided in accordance with said operator-set fuel throttle demand device and at least one mode of operation wherein engine fueling is provided to achieve a requested engine speed (ES) value, and said control unit issues command signals to said engine controller.

5. The method of claim 4 further comprising:

determining if current engine speed and throttle demand device setting will prevent engagement of said target gear ratio;

if current engine speed and throttle demand device setting will not prevent engagement of said target gear ratio, commanding the engine controller to fuel said engine in accordance with said operator-set fuel throttle demand device; and if current engine speed and throttle demand device setting will prevent engagement of said target gear ratio, commanding said engine controller to cease fueling said engine in accordance with said operator-set fuel throttle demand device and instead to fuel said engine to achieve a requested engine speed value determined to allow engagement of said target ratio.

6. The method of claims 1, 2, 3, 4 or 5 wherein said control unit is microprocessor-based.

7. The method of claim 6 wherein said control unit communicates over an electronic data link (DL) conforming to an industry-recognized protocol (SAE J-1922/1939).

8. The method of claim 1 wherein said main transmission section gear ratios are engaged by engaging at least a selected set of main transmission section positive jaw clutch members.

9. A control for controlling an ECU-assisted, manually shifted splitter-type vehicular transmission system during a compound shift into a target gear ratio ($GR_T$), said transmission system comprising a fuel-controlled engine, an engine controller for controlling the supply of fuel to the engine in response to command signals, a splitter-type mechanical change-gear transmission having an input shaft driven by said engine, an output shaft and defining a plurality of selectively engaged and disengaged gear ratios for providing various ratios of input shaft rotational speed to output shaft rotational speed (IS/OS), said transmission including (i) a main transmission section shifted by a shift lever and defining a plurality of selectable main section gear ratios and a main section neutral and (ii) a splitter section connected in series with said main transmission section, said splitter section including a positive splitter clutch mechanism for engaging a splitter high ratio and a splitter low ratio, a three-position splitter shift actuator for controlling engagement and disengagement of said positive splitter clutch mechanism in response to command signals, said actuator having (i) a first position for engaging said splitter high ratio and disengaging said splitter low ratio, (ii) a second position for engaging said splitter low ratio and disengaging said splitter high ratio and (iii) a third position for disengaging both said splitter high and low ratios, a splitter selection switch for providing a signal indicative of an operator selection of a splitter section shift, a control unit for receiving input signals indicative of vehicle operating conditions including at least one of (i) engine rotational speed (ES), (ii) input shaft rotational speed (IS), (iii) output shaft rotational speed (OS), (iv) operator selection of a splitter shift (High/Low) and (v) transmission main section engaged condition (GR), and for processing same according to logic rules to issue command signals to at least said splitter shift actuator, said control comprising:

means for determining an attempted compound shift into a target gear ratio ($GR_T$) by sensing selection of splitter section shift and a shift into main transmission section neutral;

means effective, upon sensing an attempted compound shift into a target gear ratio, for commanding said splitter shift actuator to move to and remain in said third position thereof until said main transmission section is sensed as being engaged in one of said main transmission section gear ratios, and then commanding said splitter shift actuator to move to the one of said first and second positions thereof associated with said target gear ratio.

10. The control of claim 9 further comprising;

means for determining an attempted completion of a compound shift into a specific target gear ratio ($GR_T$)

by sensing the requested splitter ratio and the specific main section ratio engaged after sensing an attempted compound shift.

11. The control of claim 10 wherein said logic rules require that input shaft speed is within an operational offset of true synchronous speed for engaging a target gear ratio ($IS=(OS*GR_T)\pm offset$) as a precondition for commanding engagement of said splitter section positive jaw clutch for completing engagement of said target gear ratio.

12. The control of claim 11 wherein said engine controller has at least one mode of operation wherein engine fueling is provided in accordance with said operator-set fuel throttle demand device and at least one mode of operation wherein engine fueling is provided to achieve a requested engine speed (ES) value, and said control unit issues command signals to said engine controller.

13. The control of claim 12 further comprising means for (i) determining if current engine speed and throttle demand device setting will prevent engagement of said target gear ratio; (ii) if current engine speed and throttle demand device setting will not prevent engagement of said target gear ratio, commanding the engine controller to fuel said engine in accordance with said operator-set fuel throttle demand device; and (iii) if current engine speed and throttle demand device setting will prevent engagement of said target gear ratio, commanding said engine controller to cease fueling said engine in accordance with said operator-set fuel throttle demand device and instead to fuel said engine to achieve a requested engine speed value determined to allow engagement of said target ratio.

14. The control of claims 9, 10, 11, 12 or 13 wherein said control unit is microprocessor-based.

15. The control of claim 14 wherein said control unit communicates over an electronic data link (DL) conforming to an industry-recognized protocol (SAE J-1922/1939).

16. A computer controller programmed for controlling an ECU-assisted, manually shifted splitter-type vehicular transmission system during a compound shift into a target gear ratio ($GR_T$), said transmission system comprising a fuel-controlled engine, an engine controller for controlling the supply of fuel to the engine in response to command signals, a splitter-type mechanical change-gear transmission having an input shaft driven by said engine, an output shaft and defining a plurality of selectively engaged and disengaged gear ratios for providing various ratios of input shaft rotational speed to output shaft rotational speed (IS/OS), said transmission including (i) a main transmission section shifted by a shift lever and defining a plurality of selectable main section gear ratios and a main section neutral and (ii) a splitter section connected in series with said main transmission section, said splitter section including a positive splitter clutch mechanism for engaging a splitter high ratio and a splitter low ratio, a three-position splitter shift actuator for controlling engagement and disengagement of said positive splitter clutch mechanism in response to command signals, said actuator having (i) a first position for engaging said splitter high ratio and disengaging said splitter low ratio, (ii) a second position for engaging said splitter low ratio and disengaging said splitter high ratio and (iii) a third position for disengaging both said splitter high and low ratios, a splitter selection switch for providing a signal indicative of an operator selection of a splitter section shift, a microprocessor-based control unit for receiving input signals indicative of vehicle operating conditions including at least one of (i) engine rotational speed (ES), (ii) input shaft rotational speed (IS), (iii) output shaft rotational speed (OS), (iv) operator selection of a splitter shift (High/Low) and (v) transmission main section engaged condition (GR), and for processing same according to logic rules to issue command signals to at least said splitter shift actuator, said computer controller programmed with logic rules for:

determining an attempted compound shift into a target gear ratio ($GR_T$) by sensing selection of splitter section shift and a shift into main transmission section neutral;

upon sensing an attempted compound shift into a target gear ratio, commanding said splitter shift actuator to move to and remain in said third position thereof until said main transmission section is sensed as being engaged in one of said main transmission section gear ratios, and then commanding said splitter shift actuator to move to the one of said first and second positions thereof associated with said target gear ratio.

17. The computer controller of claim 16 further comprising programmed logic rules for determining an attempted completion of a compound shift into a specific target gear ratio ($GR_T$) by sensing the requested splitter ratio and the specific main section ratio engaged after sensing an attempted compound shift.

18. The computer controller of claim 17 wherein said logic rules require that input shaft speed is within an operational offset of true synchronous speed for engaging a target gear ratio ($IS=(OS*GR_T)\pm offset$) as a precondition for commanding engagement of said splitter section positive jaw clutch for completing engagement of said target gear ratio.

19. The computer controller of claim 17 wherein said engine controller has at least one mode of operation wherein engine fueling is provided in accordance with said operator-set fuel throttle demand device and at least one mode of operation wherein engine fueling is provided to achieve a requested engine speed (ES) value, and said control unit issues command signals to said engine controller.

20. The computer controller of claim 18 further comprising programmed logic rules for:

determining if current engine speed and throttle demand device setting will prevent engagement of said target gear ratio;

if current engine speed and throttle demand device setting will not prevent engagement of said target gear ratio, commanding the engine controller to fuel said engine in accordance with said operator-set fuel throttle demand device; and if current engine speed and throttle demand device setting will prevent engagement of said target gear ratio, commanding said engine controller to cease fueling said engine in accordance with said operator-set fuel throttle demand device and instead to fuel said engine to achieve a requested engine speed value determined to allow engagement of said target ratio.

* * * * *